(12) United States Patent
Slatter

(10) Patent No.: US 7,395,772 B2
(45) Date of Patent: Jul. 8, 2008

(54) ACCESSORY READY ASSEMBLY

(76) Inventor: Stephen O. Slatter, 9600 Mendocino Dr., Fort Meyers, FL (US) 33919-7777

( * ) Notice: Subject to any disclaimer, the term of this patent is extended or adjusted under 35 U.S.C. 154(b) by 0 days.

(21) Appl. No.: 11/502,328

(22) Filed: Aug. 10, 2006

(65) Prior Publication Data

US 2007/0044367 A1 Mar. 1, 2007

Related U.S. Application Data

(60) Provisional application No. 60/708,128, filed on Aug. 10, 2005.

(51) Int. Cl.
*B63B 17/00* (2006.01)
(52) U.S. Cl. .................... 114/343; 403/359.5
(58) Field of Classification Search .......... 114/343, 114/364, 361; 403/359.1, 359.5; 43/21.2

See application file for complete search history.

(56) References Cited

U.S. PATENT DOCUMENTS

| 3,834,057 | A | * | 9/1974 | Jansa | 43/21.2 |
| 3,923,409 | A | * | 12/1975 | Stoner | 403/290 |
| 5,628,578 | A | * | 5/1997 | McClanahan et al. | 403/290 |
| 6,637,146 | B2 | * | 10/2003 | Ernst | 43/21.2 |

\* cited by examiner

*Primary Examiner*—Sherman Basinger
(74) *Attorney, Agent, or Firm*—Robert M. Schwartz; Alfred K. Dassler

(57) ABSTRACT

The present invention is an accessory ready assembly that mounts to a support structure on a marine vessel. The assembly includes a male spline fitting having an end face that is configured to mount onto the support structure. A female spline connector is removably disposed on the male spline fitting. An accessory is disposed on an end of the female spline connector. A clamp is disposed on the female spline connector. The clamp securely fastens the female spline connector and the accessory to the male spline fitting.

6 Claims, 24 Drawing Sheets

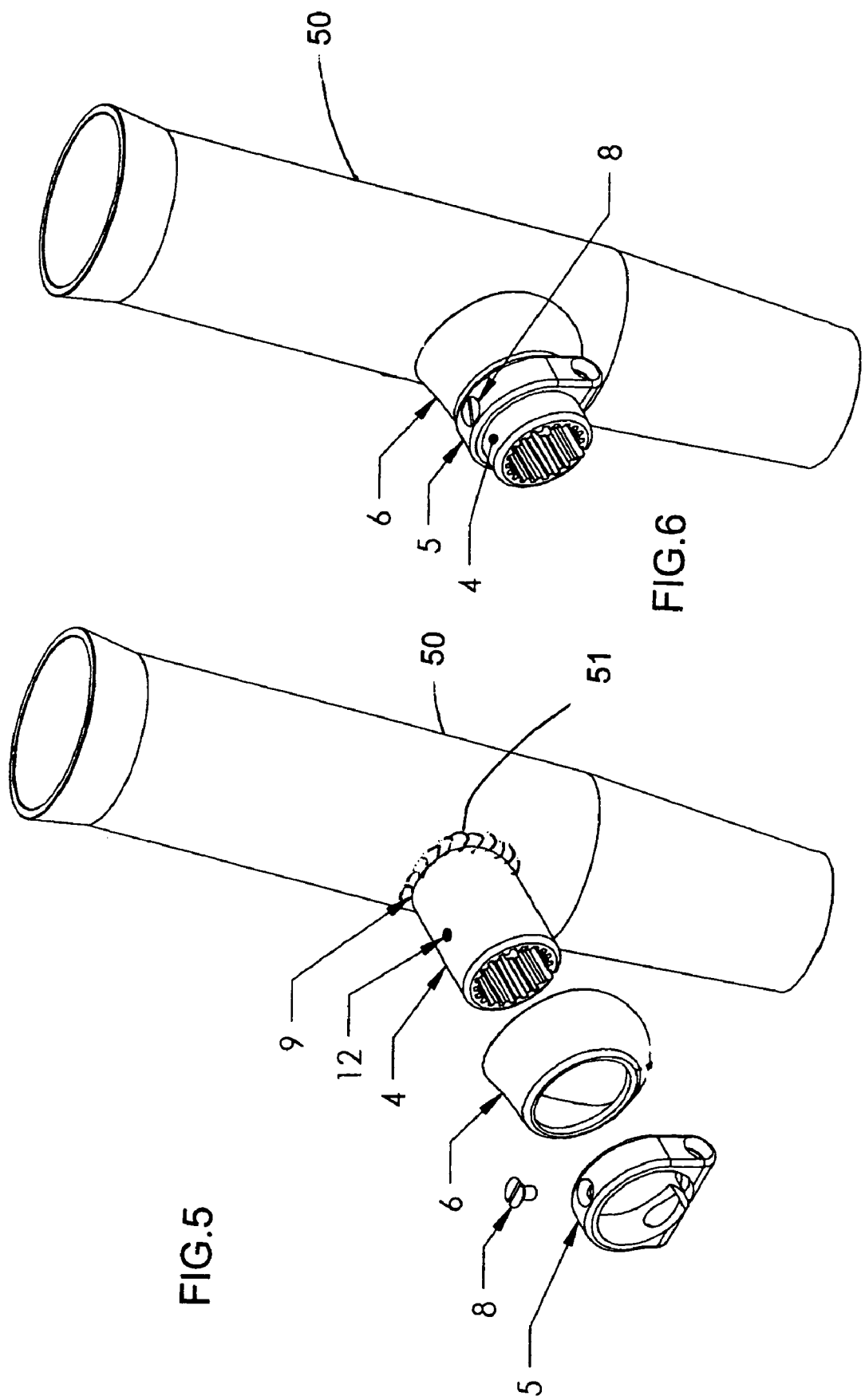

ACCESSORY READY ASSEMBLY

CROSS-REFERENCE TO RELATED APPLICATIONS

This application claims the benefit of U.S. Provisional Application Ser. No. 60/708,128, filed on Aug. 10, 2005, entitled Accessory Ready Assembly, the prior application is herewith incorporated by reference in its entirety.

BACKGROUND OF THE INVENTION

1. Field of the Invention

The present invention pertains to a mounted splined fitting system that permits mounting of a variety of accessories to a supporting framework or structure of a marine vessel. More specifically, to an accessory ready assembly that is mounted to a structure of a marine vessel for holding fishing rods or other accessories.

2. Description of the Related Art

Marine vessels typically have multiple accessories such as fishing rod holders, antennas, cup holders, spotlights, speakers, wakeboard racks, cutting boards & barbeques pre-installed to the vessel during construction or are later attached by the user for the purpose of improving the vessel as desired by the owner.

These accessories are typically either welded permanently in place or attached by a clamping and bolting method to a supporting framework or the side paneling bodywork of the vessel so as to position the accessories in an ideal or suitable position as required by the particular accessory.

A fishing rod holder is typically positioned on a tubular section of the vessels framework for the purpose of supporting a removable fishing rod while fishing. The original mounted position on the tubular section of the rod holder typically dictates the positioning angle of the fishing rod relative to the vessel and surrounding water of the vessel. The position cannot readily be changed without hand tools being used to adjust them or cut off and re-welded elsewhere on the framework.

A rod holder typically serves as a rigid support for the fishing rod so as to be able to store the fishing rod in a safe position when not in use in order to prevent injury to occupants of the vessel. The rod holder also positions the fishing rod and its tip end at a suitable angle relative to the water for enabling fishing line and bait to be deployed from the fishing rod for the intended purpose of catching fish by what in one particular practice is termed "trolling".

Often times a fishing rod needs to be repositioned relative to the vessel's structure while in use to allow the fishing rod line to be deployed at a different angle relative to the water and boat in order to space the multiple lines of the fishing rods in the water to prevent tangling during fishing.

Other accessories such as speakers, antennas, flag poles and spot lamps all sometimes are also mounted onto a vessel's structure, which sometimes need to be adjusted around at least one axial fixed plane.

Pre-installed rod holders and other multiple accessories are quite often not positioned on the supporting structure according to an end user's particular preference. Often the choice and color of the rod holders or accessories offered by the manufacturer on and included with the vessel or framework structure is not acceptable to the end user. Furthermore, sometimes damage occurs during freight to pre-installed mounted accessories the item has had to be replaced, which quite often is not practical as they are usually welded to a support structure.

Existing welded-on rod holders or accessories prevent any adjustment at all as these rod holders have to be cut off and repositioned and welded back on to suit the mounting position preference of the end user of the vessel. This practice is time consuming and not practical.

Also, welded-on rod holders, accessories and support structures often have a weld bead visible to the naked eye and often times has visible surface weld flaws and joints that are not cosmetically appealing. This is because the welded joint is poorly welded or spray-painted after welding for corrosion protection, which does not always match the structures original color.

Existing rod holders and accessories are usually axially adjustable along and around a supporting tubular framework section of the vessel, which permits a change of angle. However, this requires hand tools to perform the adjusting task by unbolting, repositioning and retightening. This is not a practical and easy task to undertake if the vessel is in use out on the ocean at the time.

Other existing bolt-on rod holders do permit adjustment in two axial planes either by utilizing a serrated tooth mid-section coupling method of connecting two halves of a rod holder to one another. This requires a user's hand to either unscrew a mid-section barrel that unlocks the serrated end teeth to permit change of the rod holder angle for one axial plane. Hand tools are required to change the other axial plane position on the structures tubular mounting surface. The mid-section adjustable type rod holder is difficult to adjust as the hand can slip while unscrewing the mid-section locking component due to the often wet and greasy boating and fishing environment which can cause the rod holder to not be totally secure.

Other various existing bolt-on rod holders and accessories require that hand tools be used for changing both axial plane mounting positions of the rod holder or accessory on the mounting structure of the vessel which is more impractical than the existing bolt-on type holders.

The disadvantages of the rod holders as described above are that the rod holder are permanently affixed to a support structure and do not allow for a practical adjustment of the rod holder. Moreover, any changes to the positioning of the rod-holders is time consuming, labor intensive, and cannot be easily made while fishing.

SUMMARY OF THE INVENTION

It is accordingly an object of the invention to provide an accessory ready assembly, which overcomes the above-mentioned disadvantages of the heretofore-known devices of this general type and which provides an accessory ready assembly that is more versatile and easier to use.

With the foregoing and other objects in view there is provided, an accessory ready assembly that mounts to a support structure on a marine vessel. The assembly includes a male spline fitting having an end face that is configured to mount onto the support structure. A female spline connector is removably disposed on the male spline fitting. An accessory is disposed on an end of the female spline connector. A clamp is disposed on the female spline connector. The clamp securely fastens the female spline connector and the accessory to the male spline fitting.

In accordance with another feature of the invention, the female spline connector has a longitudinal slot and a cutout formed therein. The clamp has a longitudinal gap formed therein defining two sides, each of the sides having a respective borehole formed therein. The cutout and the boreholes receive a fastener for fastening the female spline connector to the male spline fitting.

In accordance with an added feature of the invention, the clamp is affixed to the female spline connector by a fastener.

In accordance with an additional feature of the invention, the fastener has a shaft. The male spline fitting has a radial groove having sidewalls. The shaft engages at least one of the sidewalls for securely fastening the female spline connector to the male spline fastener.

In accordance with yet an additional feature of the invention, the fastener includes a nut and a knob for allowing a hand tightening of the fastener.

In accordance with a further feature of the invention, the male spline fitting has a longitudinal through hole formed therein for allowing electrical wires to pass through to the accessory.

In accordance with yet another feature of the invention, the male spline fitting has a longitudinal threaded hole formed therein for fastening the male spline fitting to the support structure.

Other features which are considered as characteristic for the invention are set forth in the appended claims.

Although the invention is illustrated and described herein as embodied as an accessory ready assembly for holding an accessory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is another partial exploded view of the accessory ready assembly according to the invention mounted on a showing a rod holder;

FIG. 6 is a partial assembly view of the accessory ready assembly according to the invention showing a rod holder;

DESCRIPTION OF THE PREFERRED EMBODIMENTS

Figure 1:
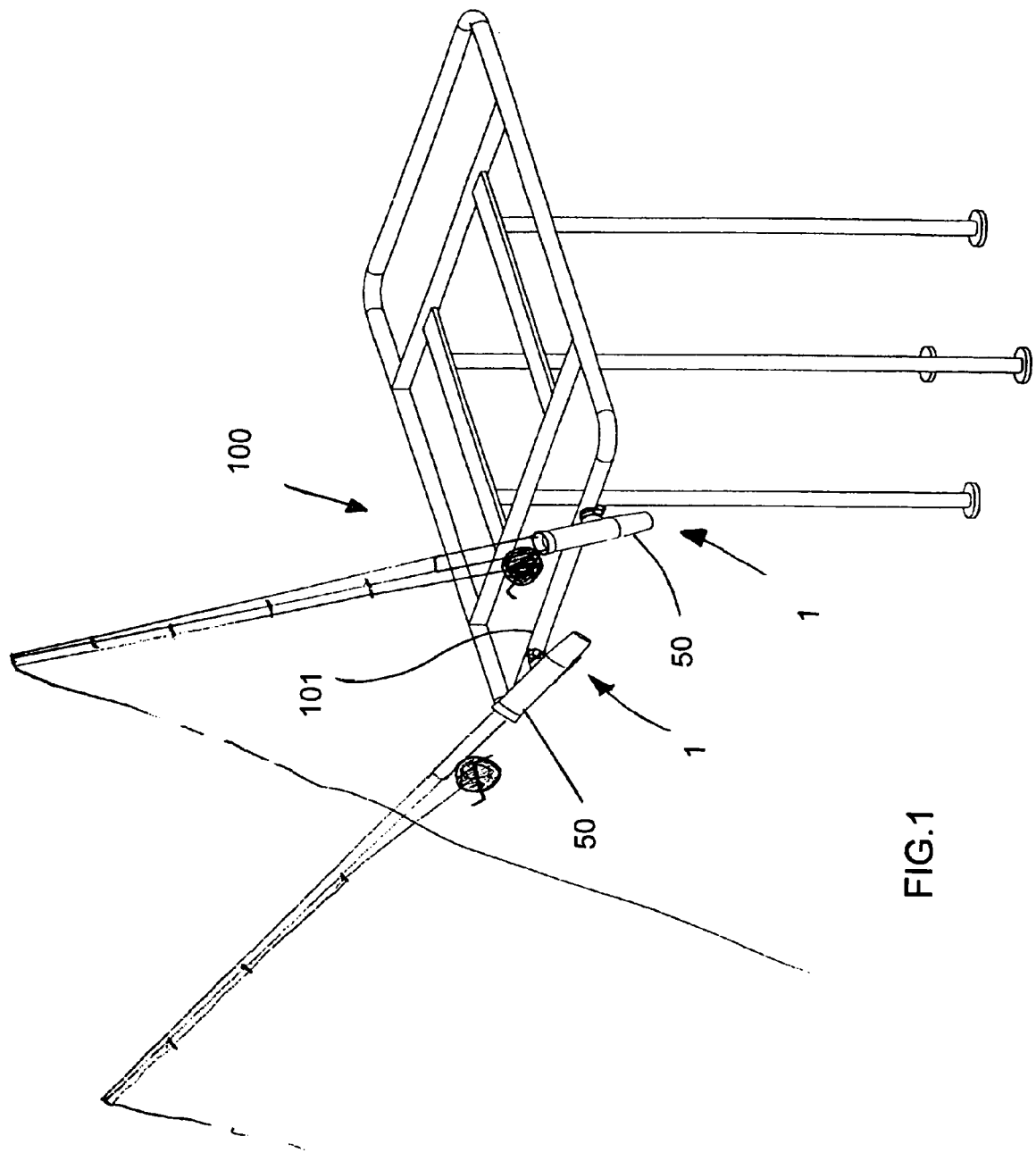
FIG. 1 is a perspective view of two accessory ready assemblies according to the invention mounted on a T-top assembly.
Figure 1A:
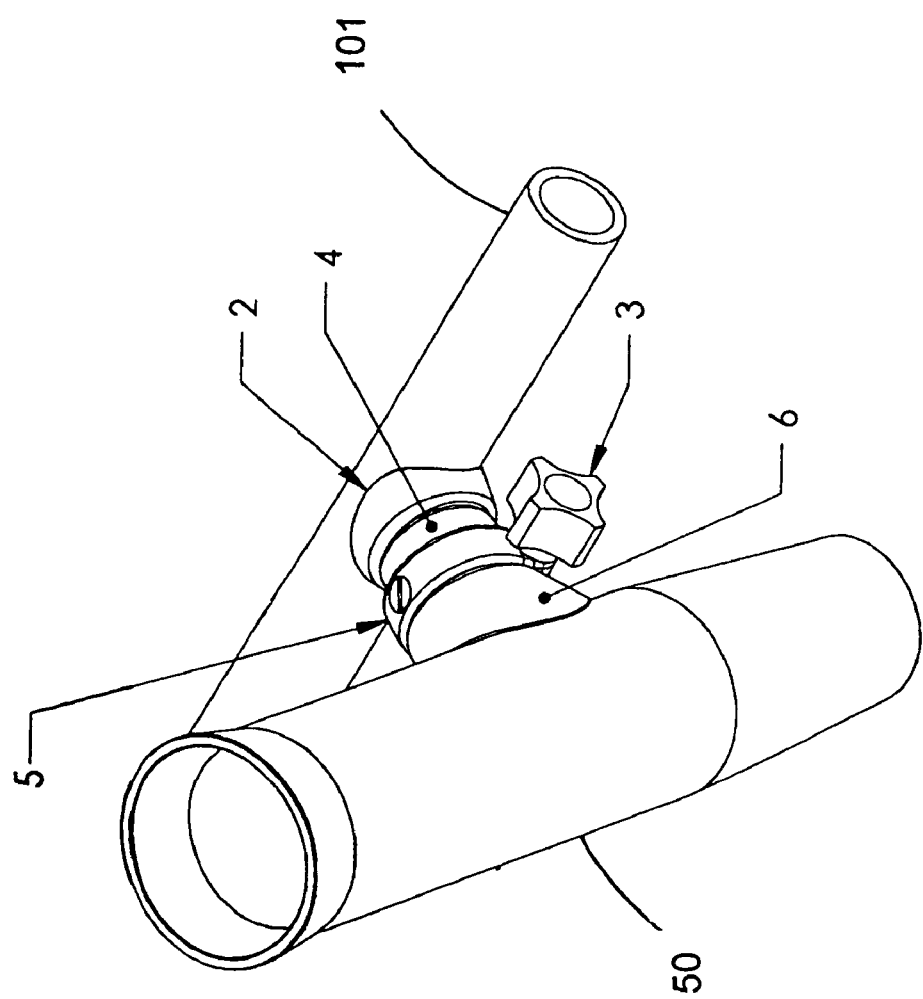
FIG. 1a is a perspective view of an accessory ready assembly according to the invention mounted on a T-top assembly having a welded configuration.
Figure 1B:
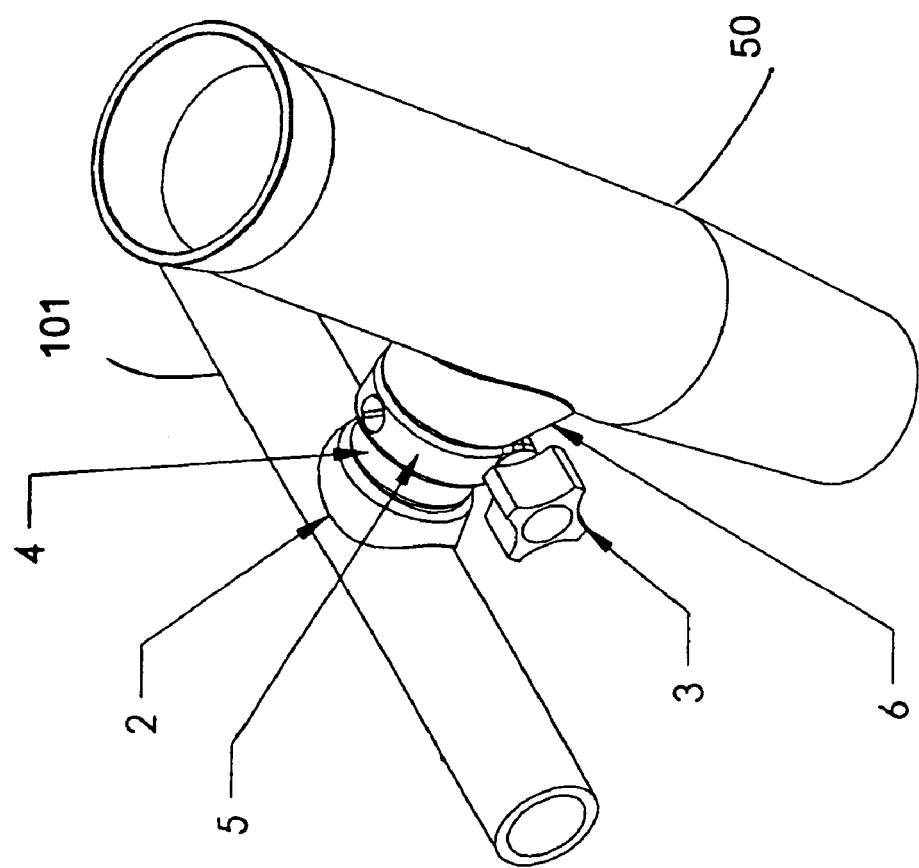
FIG. 1b is another perspective view of the accessory ready assembly according to the invention mounted on a T-top assembly positioned at a different position having the welded configuration.
Figure 2:
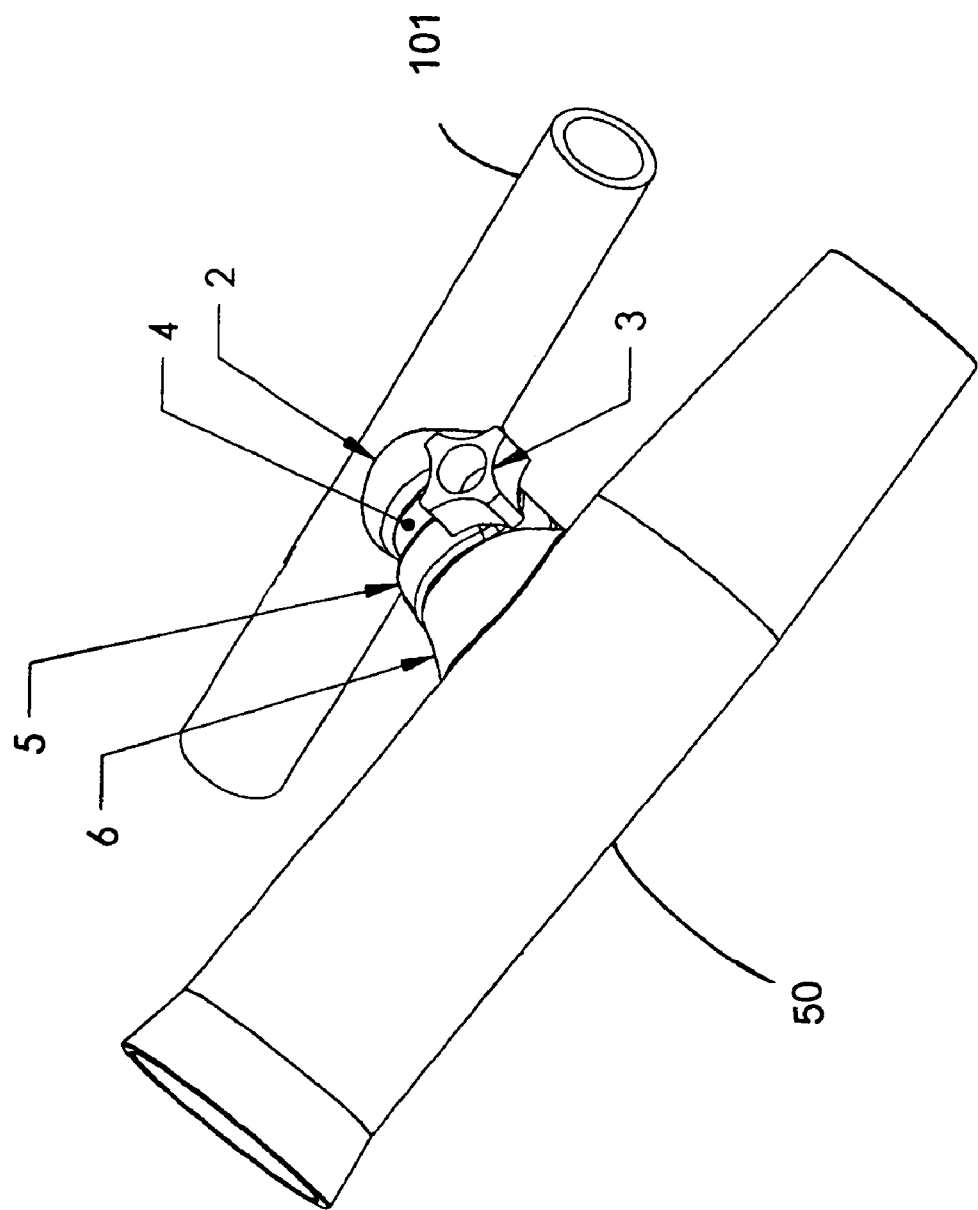
FIG. 2 is another perspective view of the accessory ready assembly according to the invention mounted on a T-top assembly in yet a different position having the welded configuration.

Referring now to the figures of the drawing in detail and first, particularly, to FIGS. 1-2, which illustrate the accessory ready assembly 1 shown with a rod holder tube 50. The assembly 1 is attached to a tube 101 of a structure 100 (such as a T-top frame). FIGS. 1a-2 show the assembly 1 with the tube 50 set to various positions with respect to the tube 101.

Figure 3:
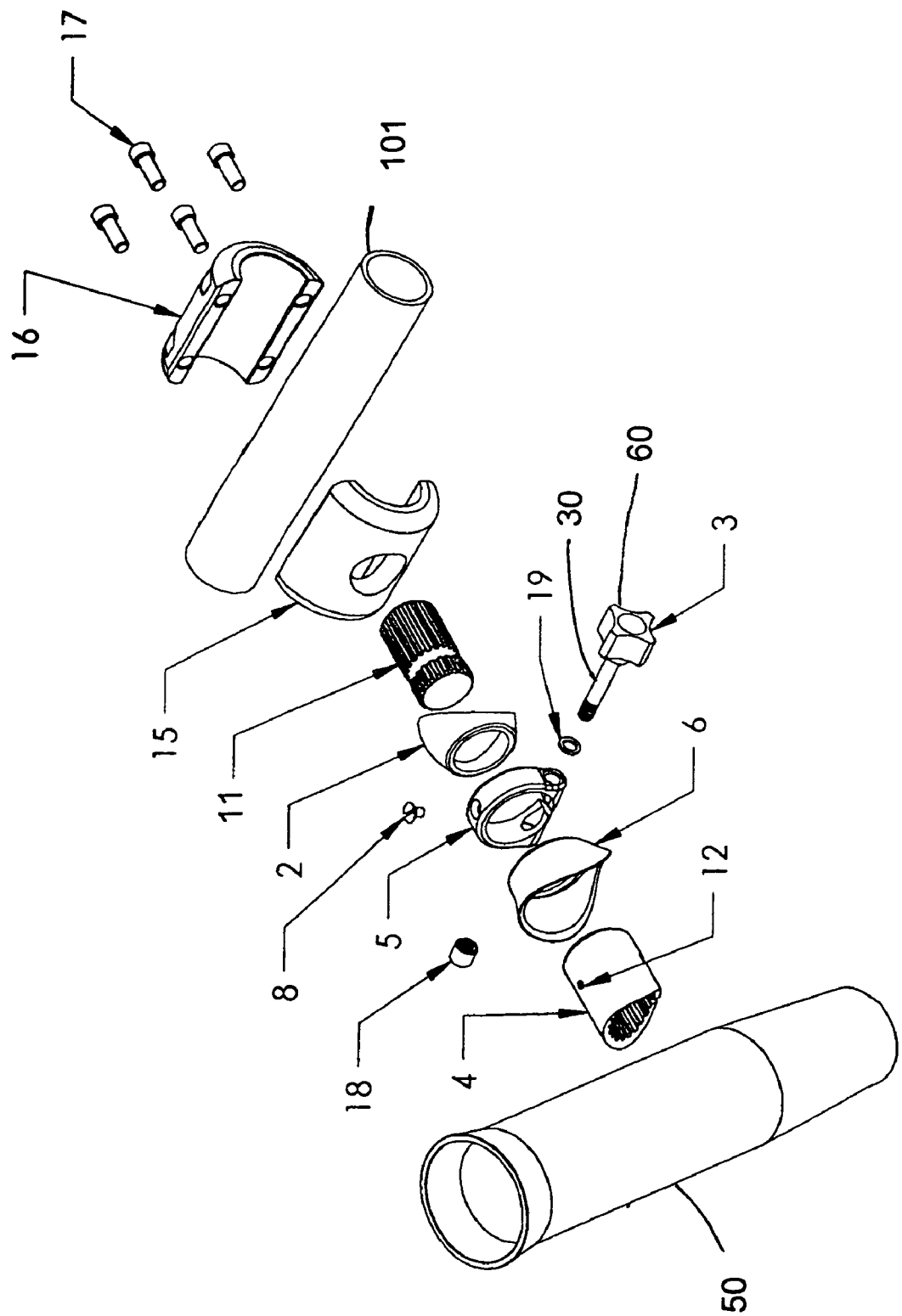
FIG. 3 is an exploded view of the accessory ready assembly according to the invention in a bolt-on configuration.
Figure 4:
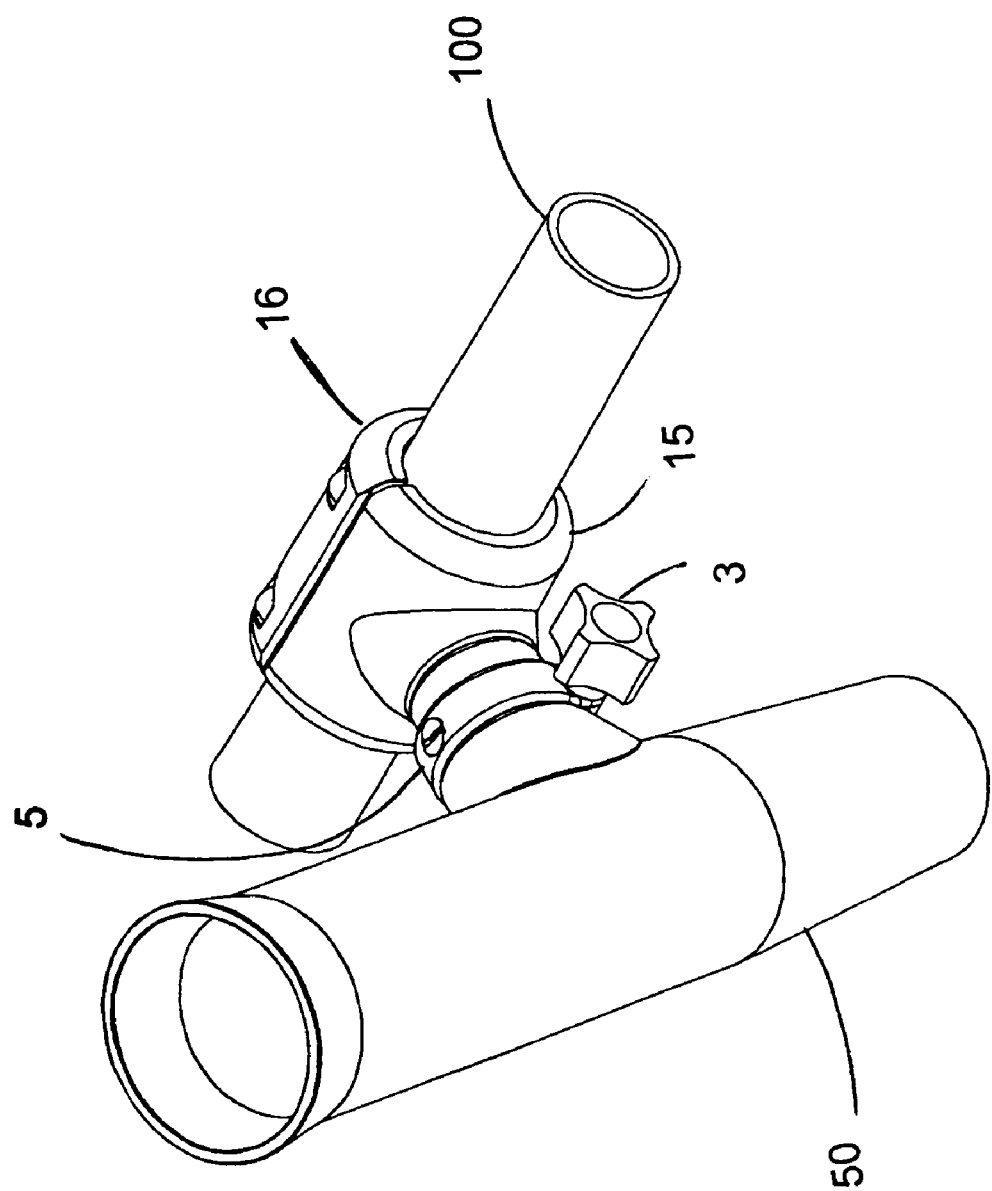
FIG. 4 is another perspective view of the accessory ready assembly according to the invention mounted on a T-top assembly having the bolt-on configuration.
Figure 7:
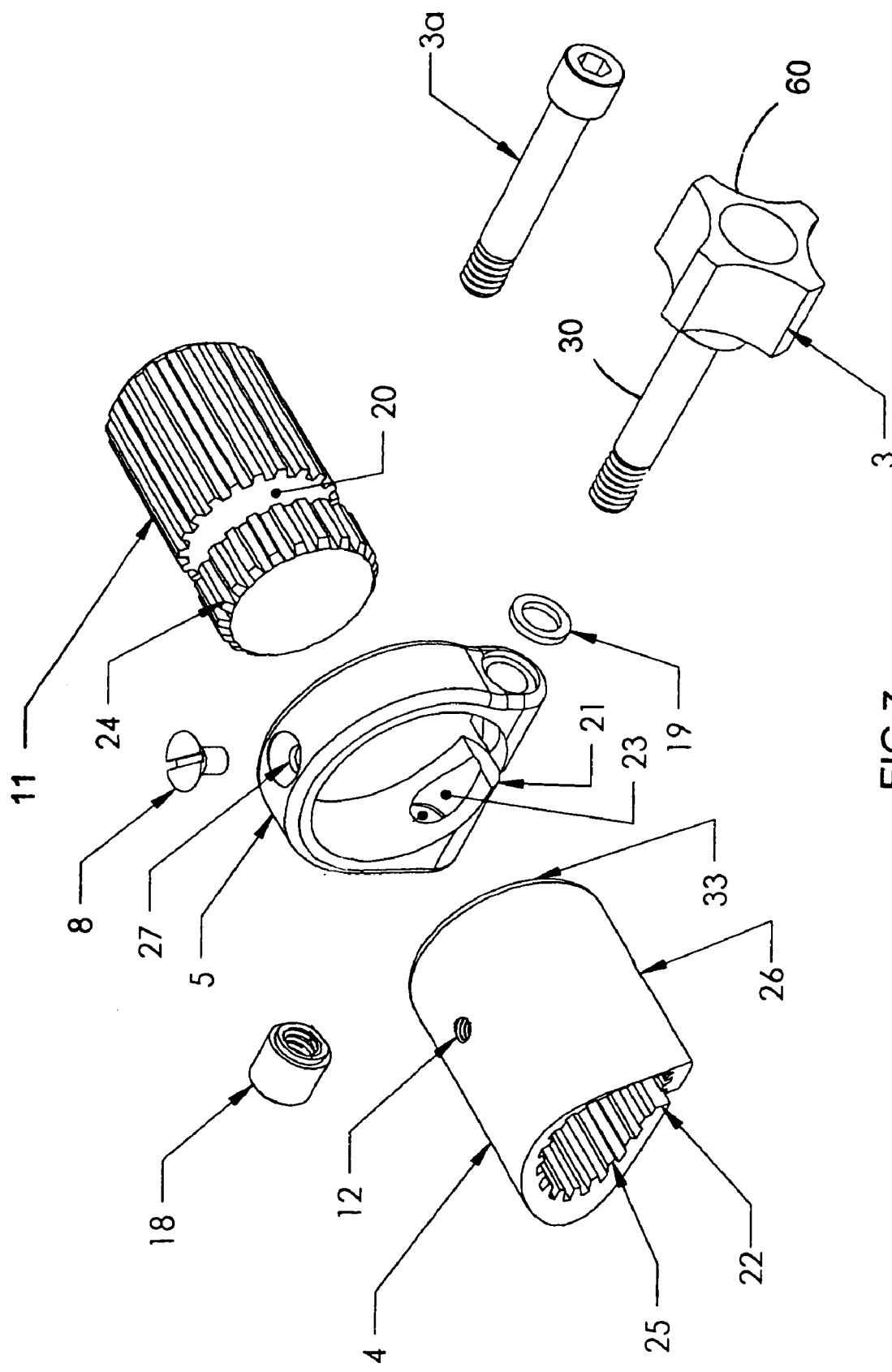
FIG. 7 is another partial exploded view of the accessory ready assembly according to the invention showing the spline connection.

FIG. 3 shows an exploded view of the assembly 1 configured to be bolted onto the tube 101. The assembly 1 includes a male spline fitting 11 and a female spline connector 4. The female spline connector 4 is affixed to the tube 50 or another accessory holder by a weld bead 51 or any other suitable connection. The weld bead 51 must be provided so as to allow the female spline connector 4 to properly clamp the male spline fitting 11 and to securely fasten the tube 50 to the female spline connector 4. The female spline connector 4 has teeth 25 provided on its inner diameter. The female spline connector 4 includes a longitudinal slot 22 (FIG. 7), which allows the female spline connector 4 to be tightened onto the male spline fitting 11. The female spline connector 4 has a cutout or bore 26 and has a threaded hole 12 for a screw 8. A cover sleeve 6 slides over the female spline connector 4 to cover the weld 51.

The male spline fitting 11 has teeth 25 provided on its outer diameter. The male spline fitting 11 includes a radial groove 20 and is either bolted to the tube 101 with first clamp half 15 and the second clamp half 16 held together by screws 17. The male spline fitting 11 is welded to first clamp half 15 or is connected thereto by any suitable connection. A second cover sleeve 2 is used to cover a weld or any other joint between the male spline connector 11 and the clamp half 15 or the tube 101.

Figure 13:
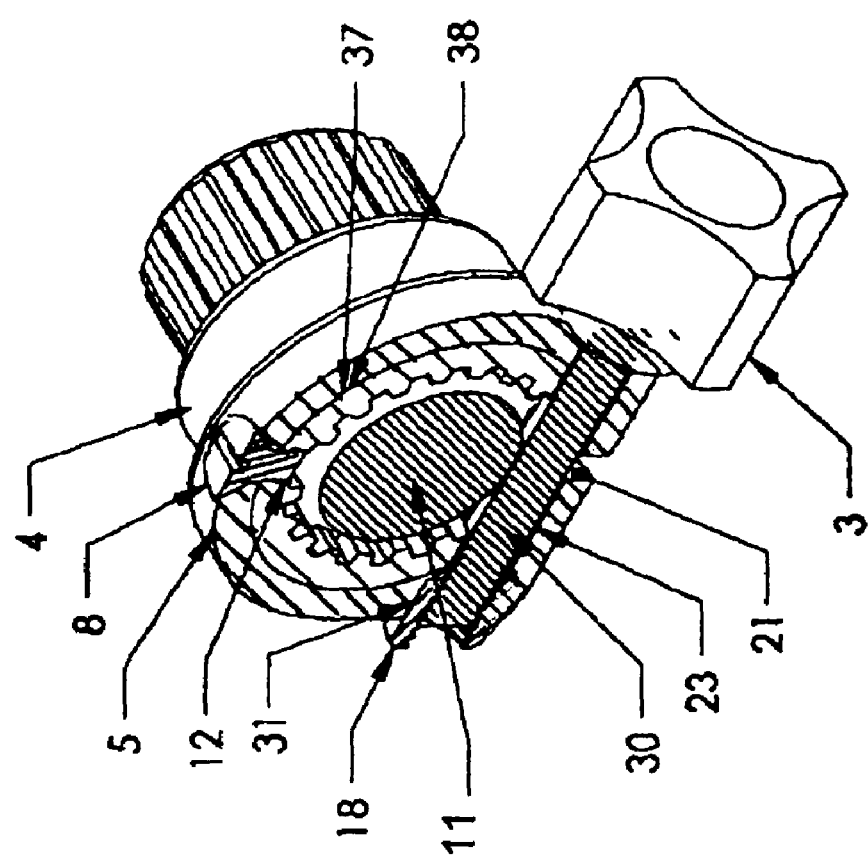
FIG. 13 is a perspective sectional view of the accessory ready assembly according to the invention.
Figure 14:
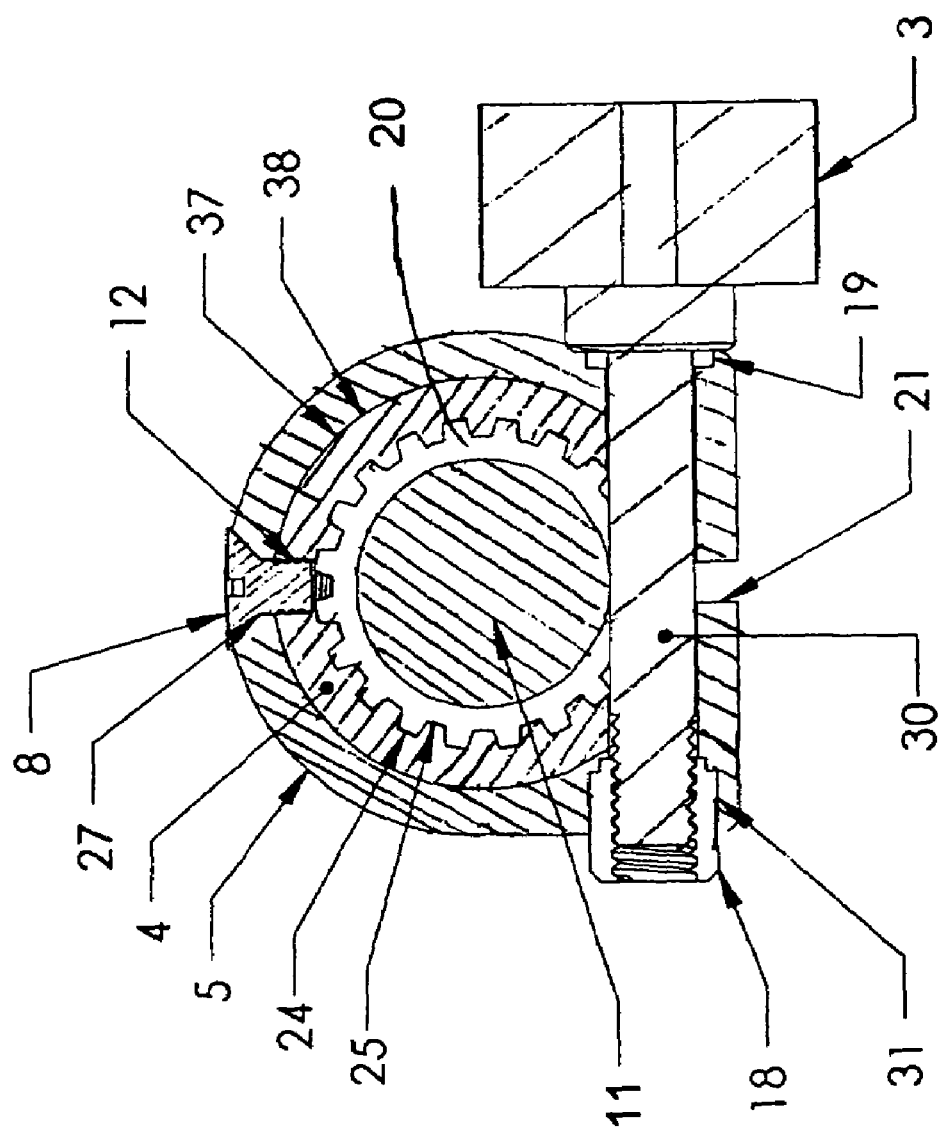
FIG. 14 is a sectional view of the accessory ready assembly according to the invention.
Figure 15:
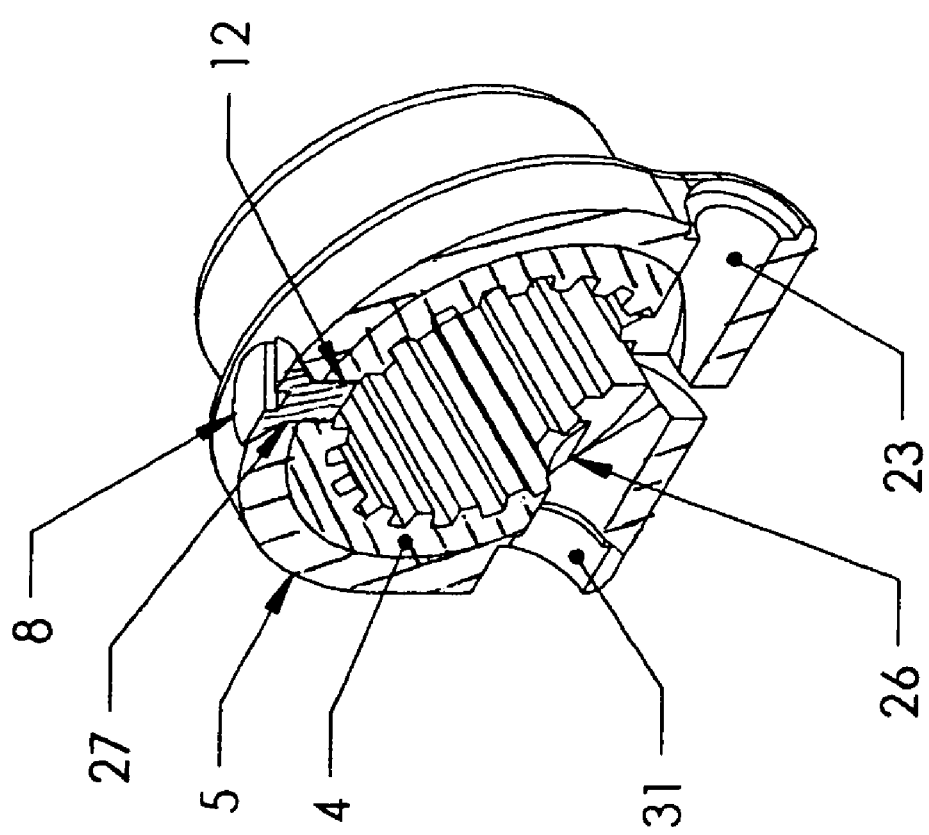
FIG. 15 is a perspective sectional view of the accessory ready assembly according to the invention without the securing fastener in place.

FIGS. 13 and 14 show the female spline connector 4 is mounted to the male spline fitting 11. A ring shaped clamp 5 has an inside diameter face 37 which is disposed on the outside diameter 38 of the female spline connector 4. The clamp 5 is held in place on the female spline connector 4 by the screw 8, which is disposed in the hole 27. When attached with the screw 8, the clamp 5 holds the cover sleeve 6 in place against the tube 50.

Figure 16:
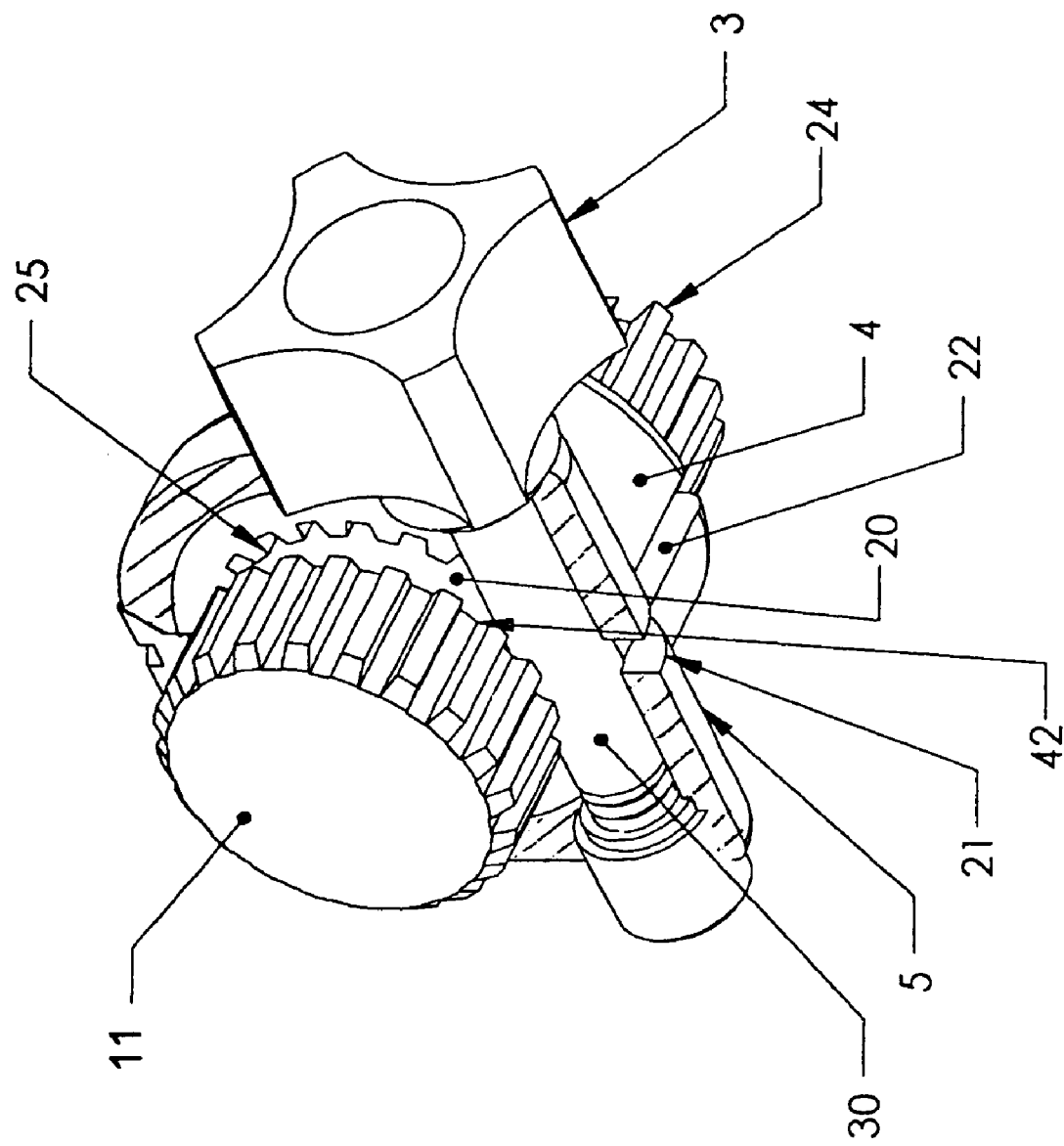
FIG. 16 is another perspective view of the accessory ready assembly according to the invention with the securing fastener in place.
Figure 17:
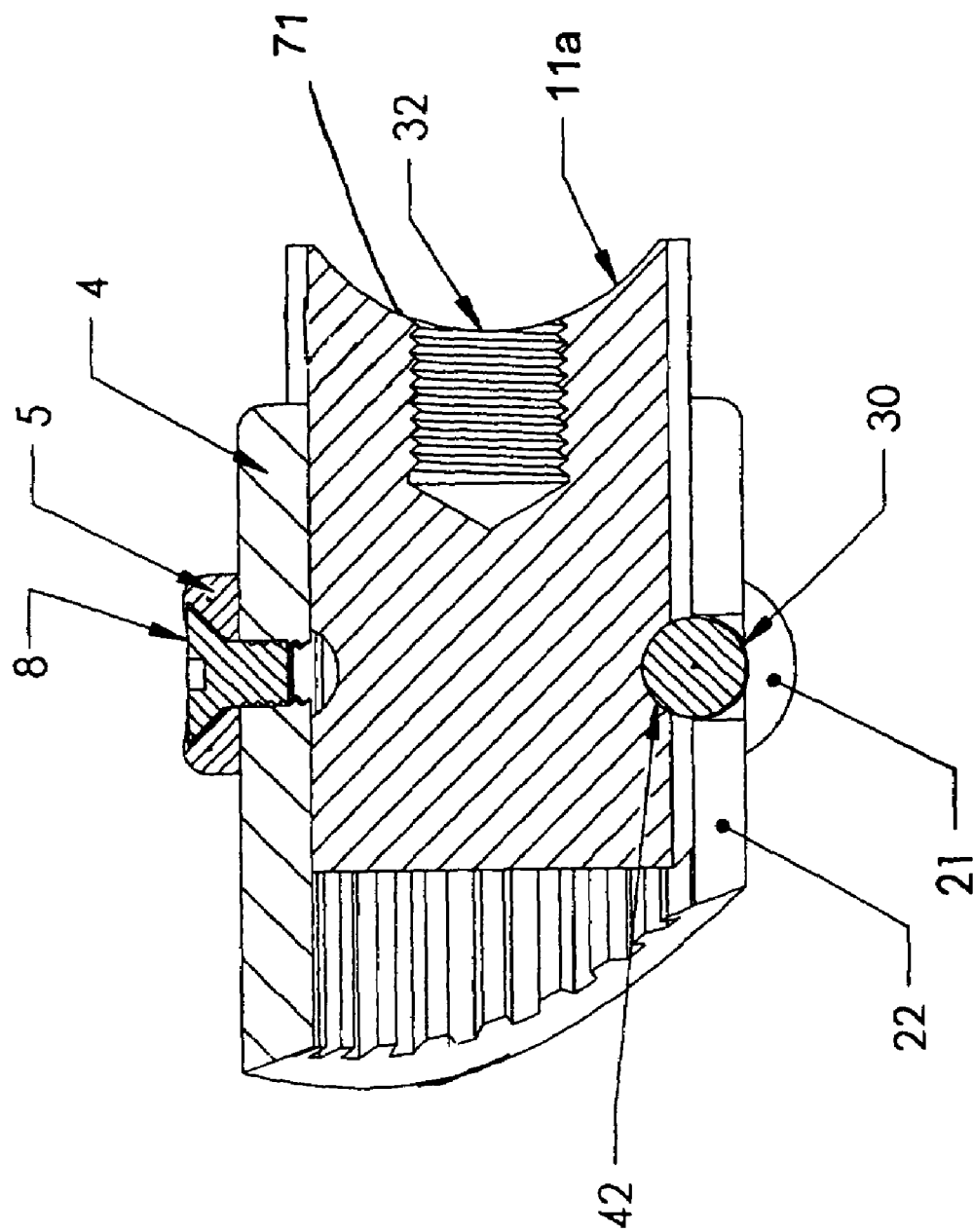
FIG. 17 is a longitudinal sectional view of the accessory ready assembly according to the invention.

The clamp 5 has a longitudinal split or gap 21, which has a bore 23 on both sides of the gap 21. A fastener 3 having a shaft portion 30 and is disposed through the bores 23, the bore 26, and the radial groove 20. The fastener 3 engages a retaining face or sidewall 42 of the radial groove 20 (FIGS. 16 and 17). The fastener 3 has a nut 18 disposed thereon for tightening the clamp 5 by narrowing the gap 21.

The reduction of the longitudinal slot 22 causes the teeth 25 of the female spline connector 4 to firmly engage the teeth 24 of the male spline fitting 11. The fastener 3 is provided with a knob 60. A further fastener 3a does not include the knob 60. A thrust washer 19 can be disposed on the shaft 30 of the fastener 3 to prevent galling. The clamp 5 has a housing bore 31 for the nut 18, which prevents the nut 18 from rotating during a tightening of the fastener 3. The above-discussed construction of the female spline connector 4, the male spline fitting 11 and the clamp 5 allows an easy adjustment of the tube 50 for allowing the desired positioning of the tube 50.

Figure 8:
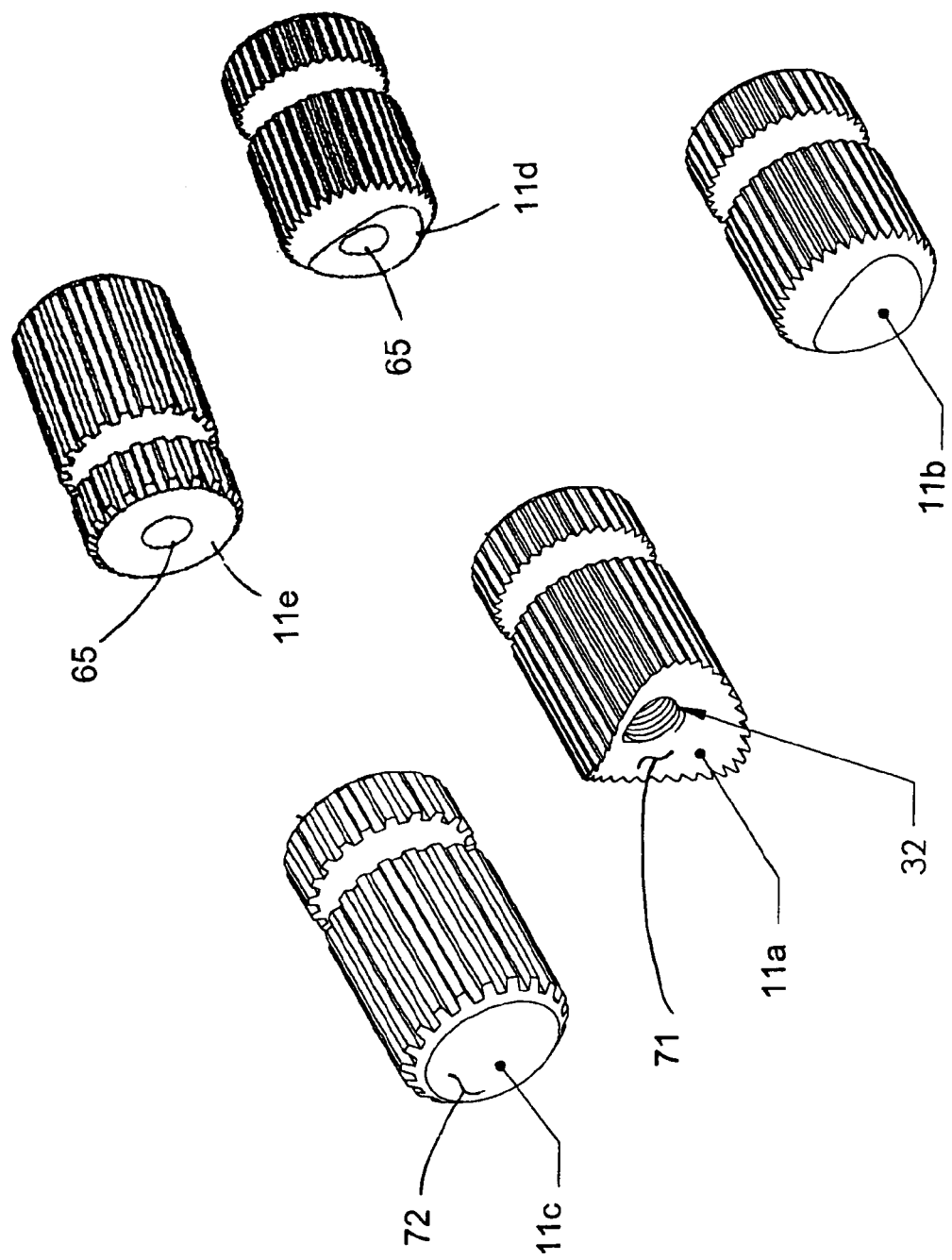
FIG. 8 is a perspective view of the accessory ready assembly according to the invention showing the different male spline connections.
Figure 9:
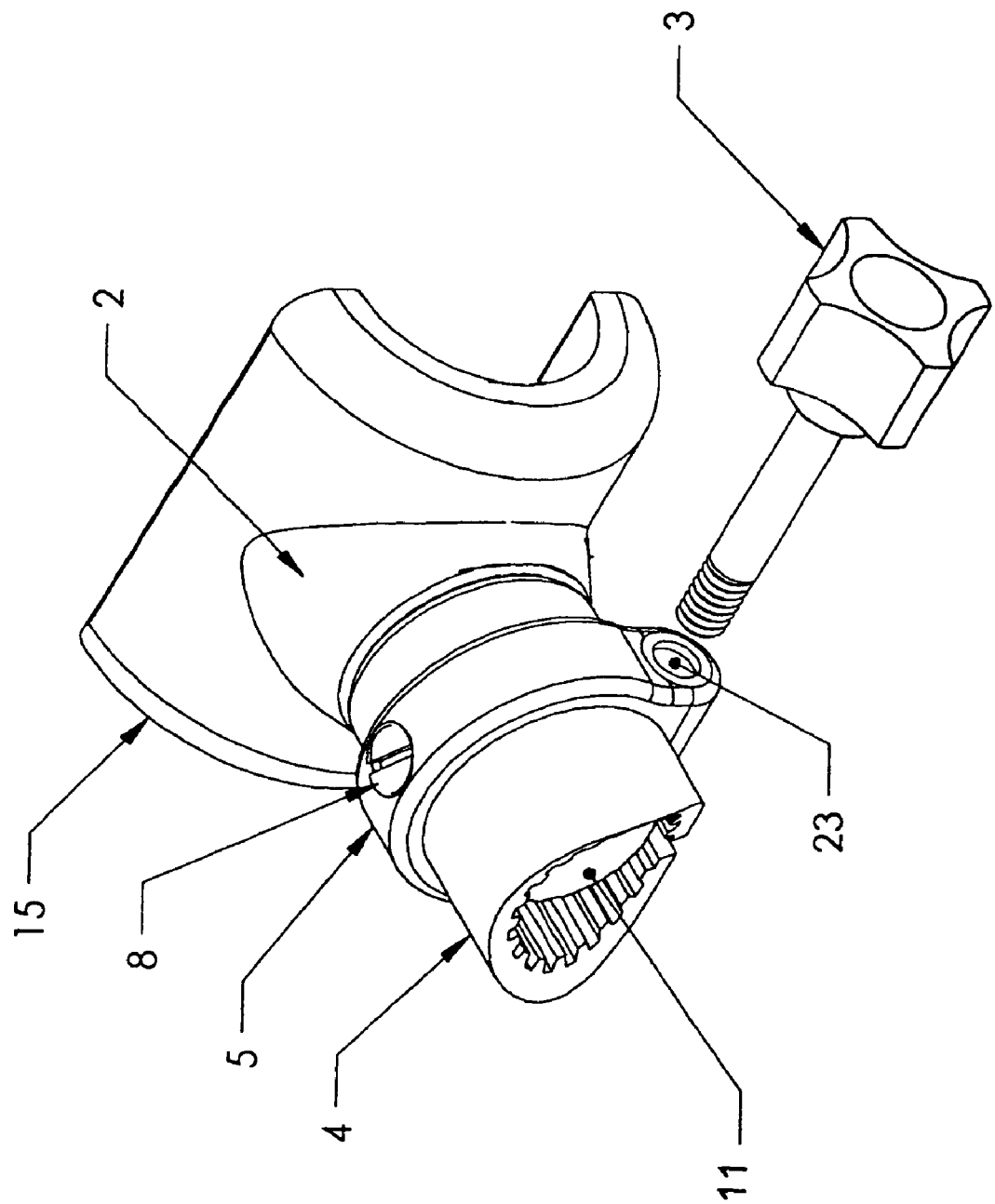
FIG. 9 is a partial assembly view of the accessory ready assembly according to the invention showing the bolt on connection.
Figure 10:
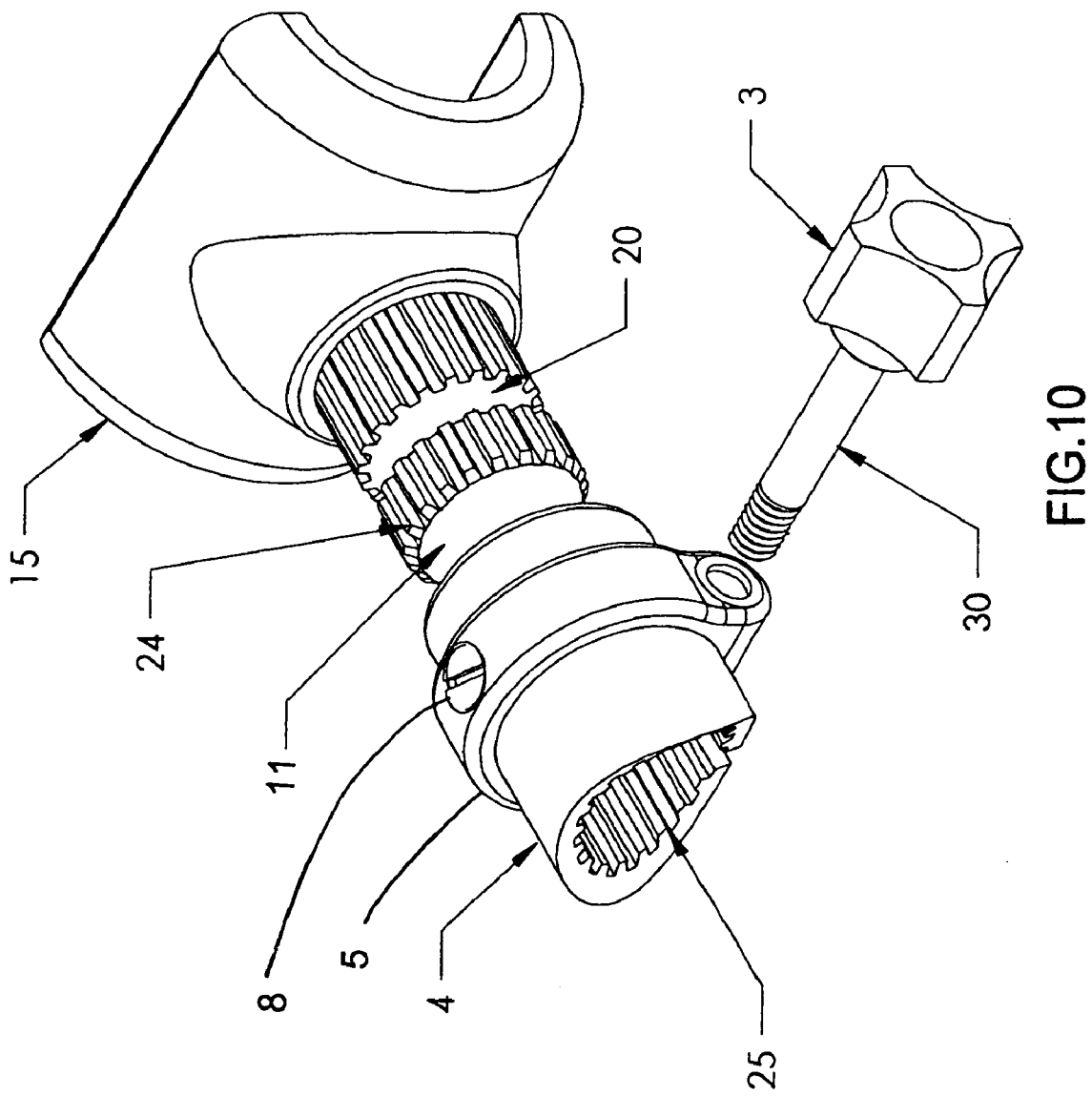
FIG. 10 is a partially exploded view of the accessory ready assembly according to the invention shown in FIG. 9.
Figure 11:
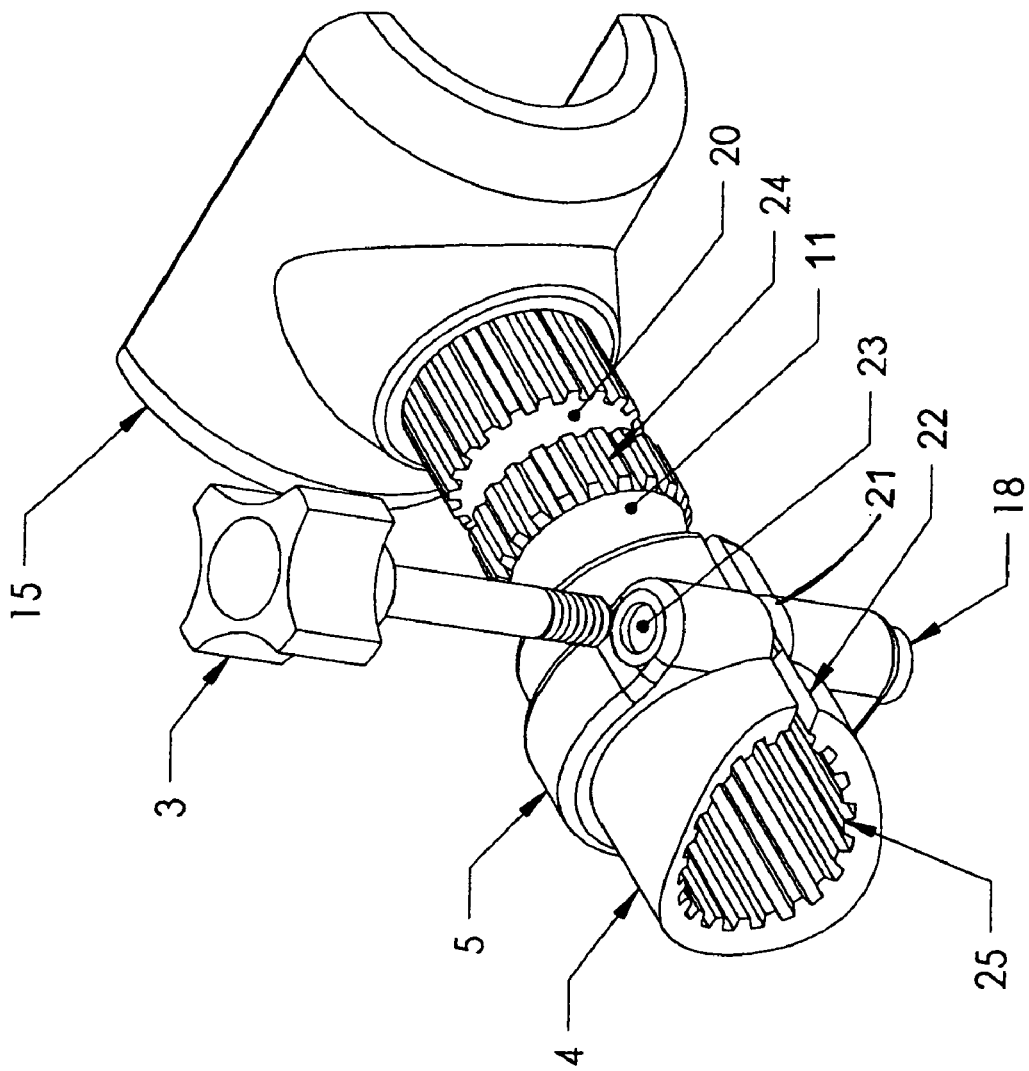
FIG. 11 is another partially exploded view of the accessory ready assembly according to the invention shown in FIG. 9.
Figure 12:
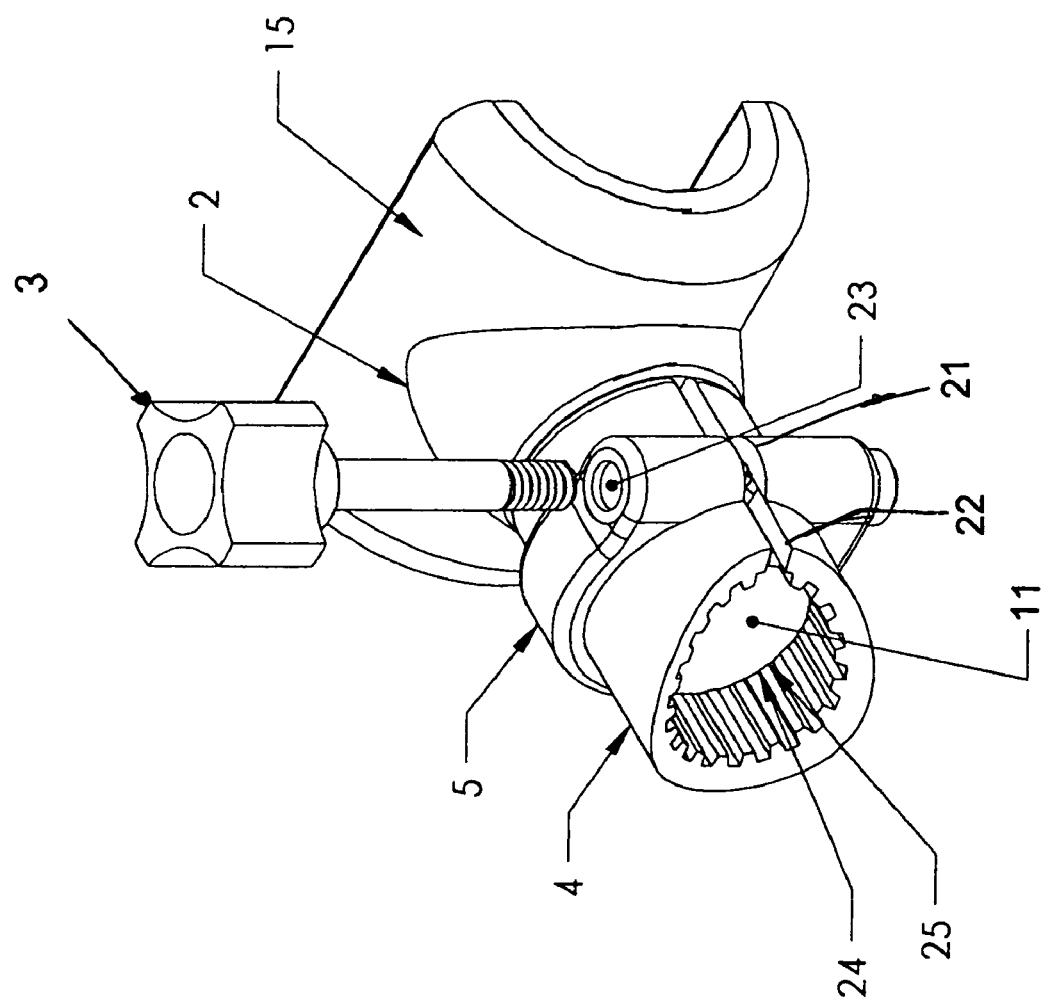
FIG. 12 is a partial assembly view of the accessory ready assembly according to the invention showing the bolt on connection corresponding to FIG. 11.

FIG. 8 shows various types of male spline fittings 11a-11e. Male spline fitting 11a has a concave end face 71 and a threaded hole 32 formed therein. The threaded hole 32 is provided to bolt the male spline fitting 11a is used to bolt the connector 11a to the tube 101. Male spline fitting 11b has a concave face 71, which matches the diameter of the tube 101 so as to allow the male spline fitting 11b to be welded to the tube 101. Male spline fitting 11c has a flat face 72 so as to allow the male spline fitting 11c to be welded to a flat support surface. Male spline fittings 11d and 11e show that a through hole 65 is formed therein. The through hole 65 allows for electrical wiring to pass through the male spline fitting when an electrical accessory is mounted on the female spline connector 4 instead of the rod holder tube 50.

Figure 18:
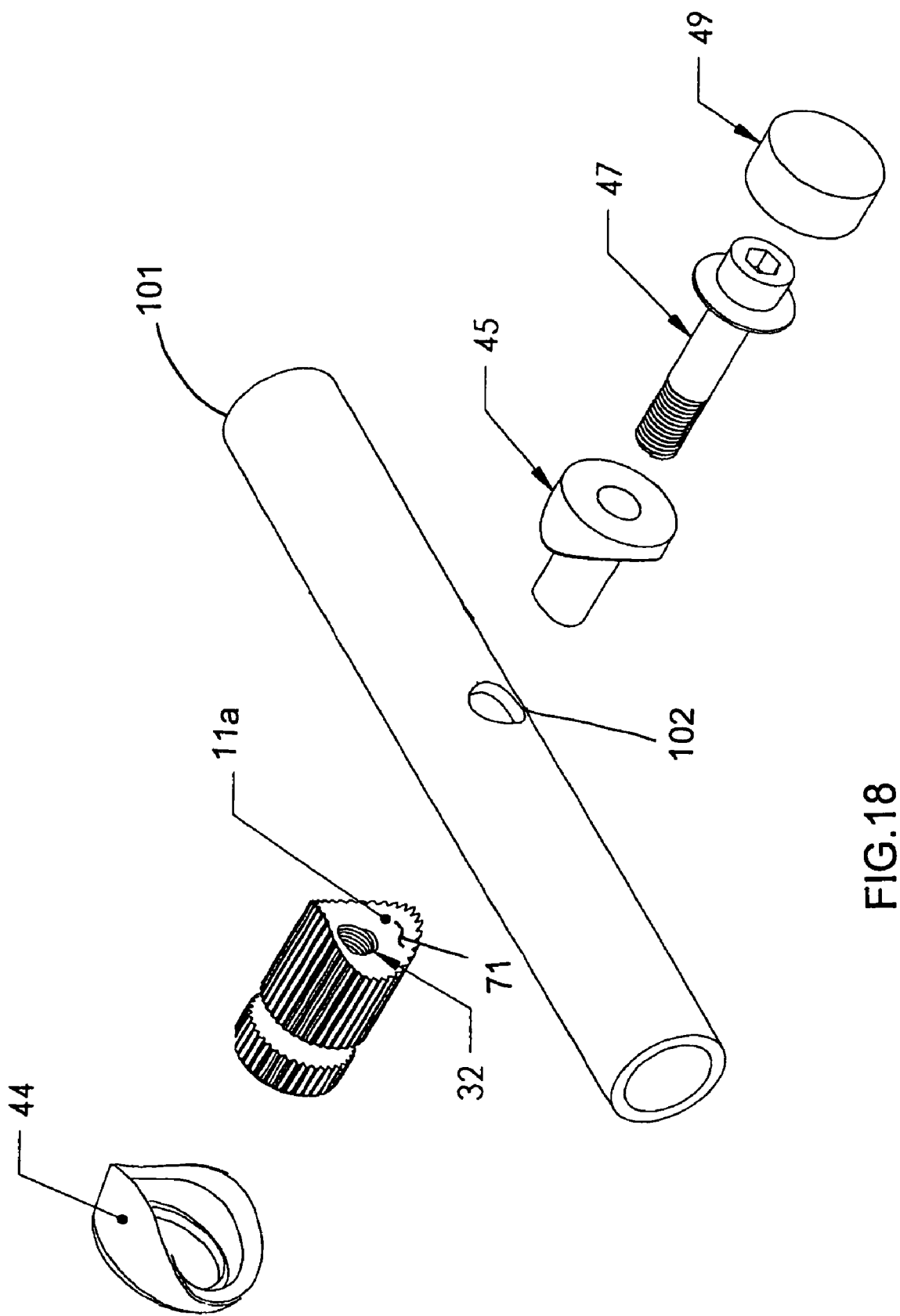
FIG. 18 is an exploded view of the accessory ready assembly according to the invention with a bolt-on male spline configuration.
Figure 20:
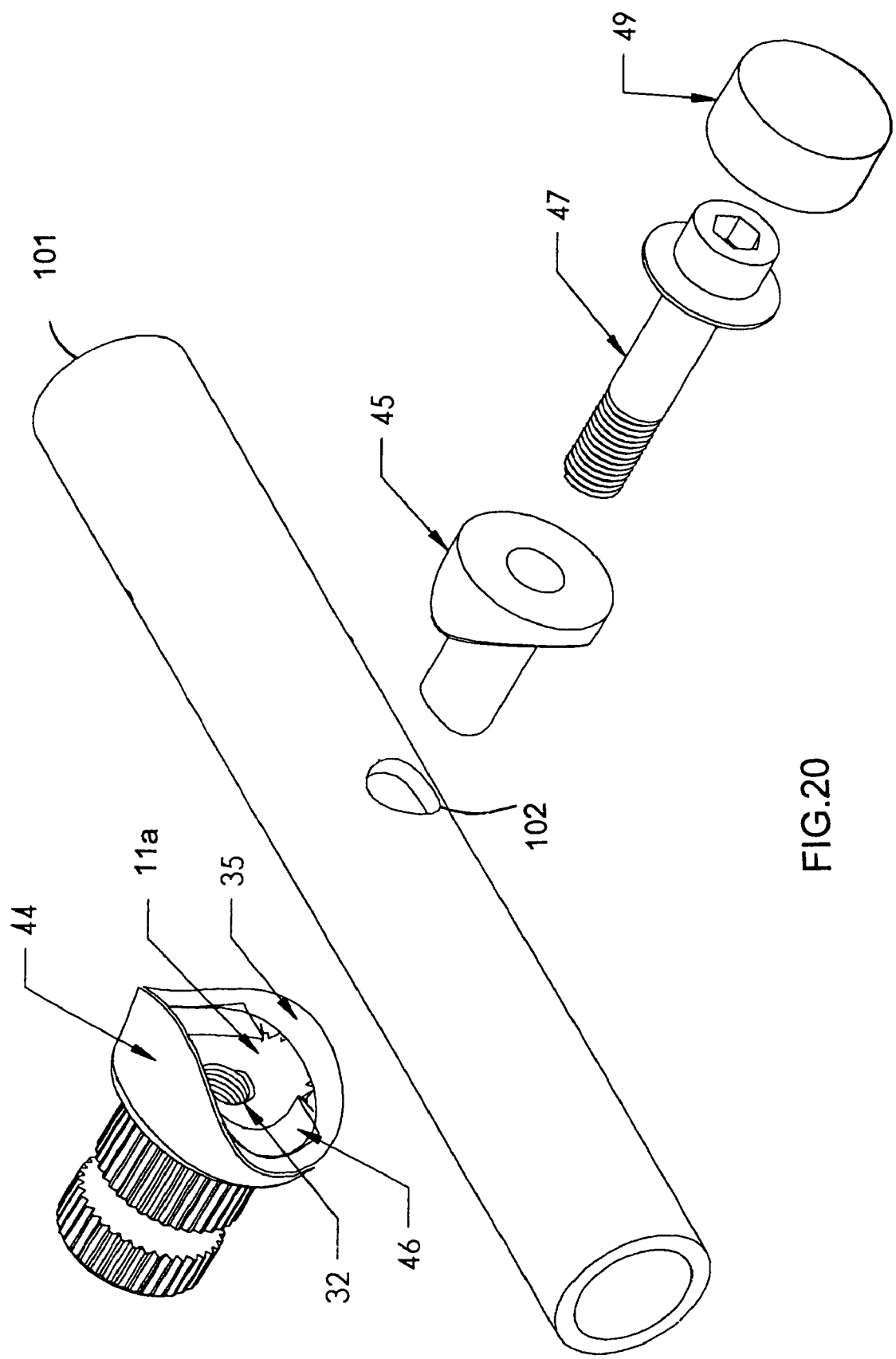
FIG. 20 is another exploded view of the accessory ready assembly according to the invention with a bolt-on male spline configuration.
Figure 21:
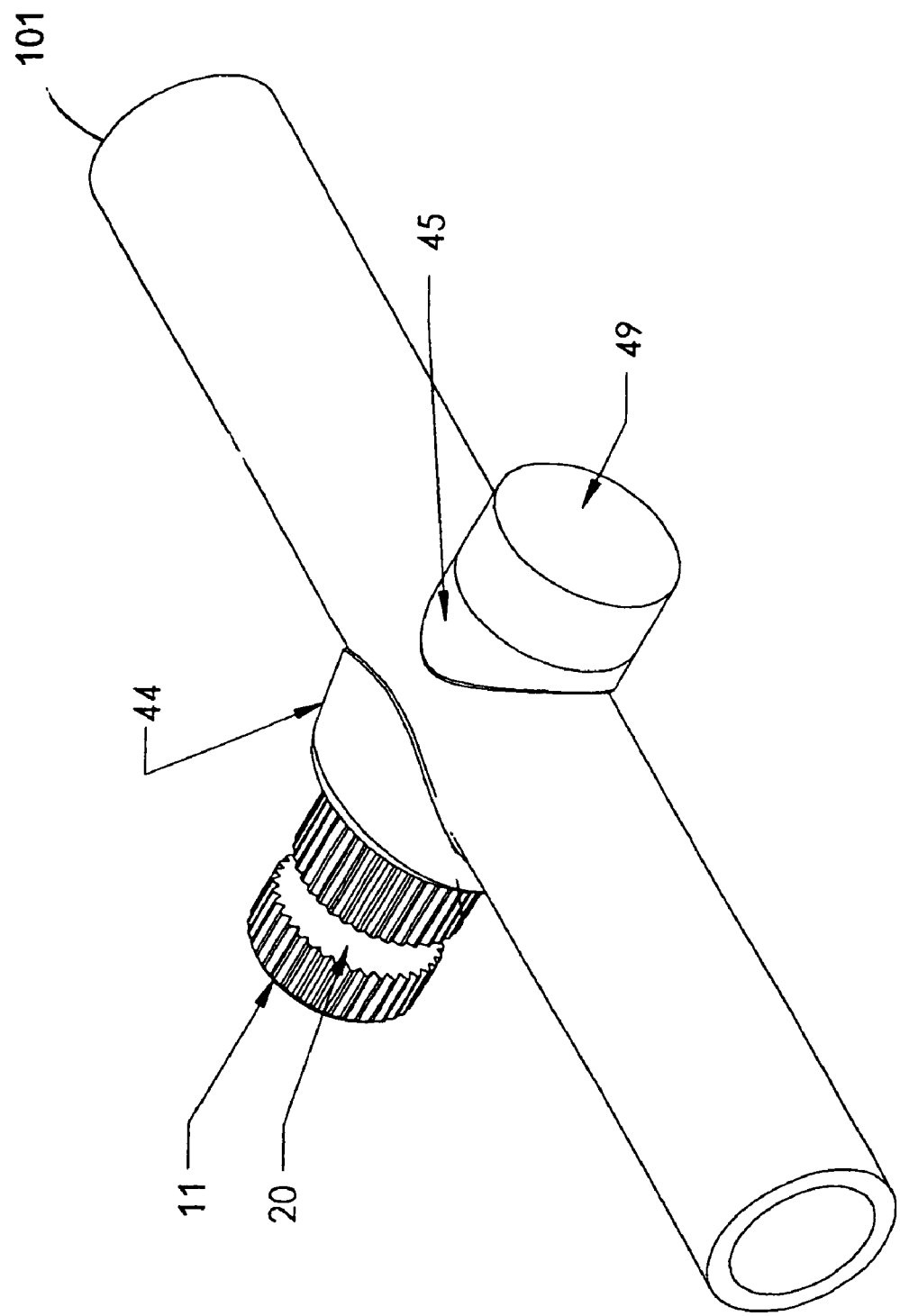
FIG. 21 is a perspective view of the accessory ready assembly according to the invention according to FIG. 20.

FIGS. 18 and 20 show the male spline fitting 11a as it is to be mounted onto the tube 101. The tube 101 has a through hole 102 formed therein, which aligns with the threaded hole 32. A threaded fastener 47 is provided with a liner spacer 45 and affixes the male spline fitting 11a to the tube 101. A cap 49 is provided to cover the end of the fastener 47. FIGS. 18 and 20 show a heavy-duty strengthening spacer 44 may be used to add support to the male spline fitting. The strengthening spacer 44 has a profile that matches the support tube 101. The strengthening spacer 44 can be welded onto the male spline fitting 11a with the weld bead 46.

Figure 19:
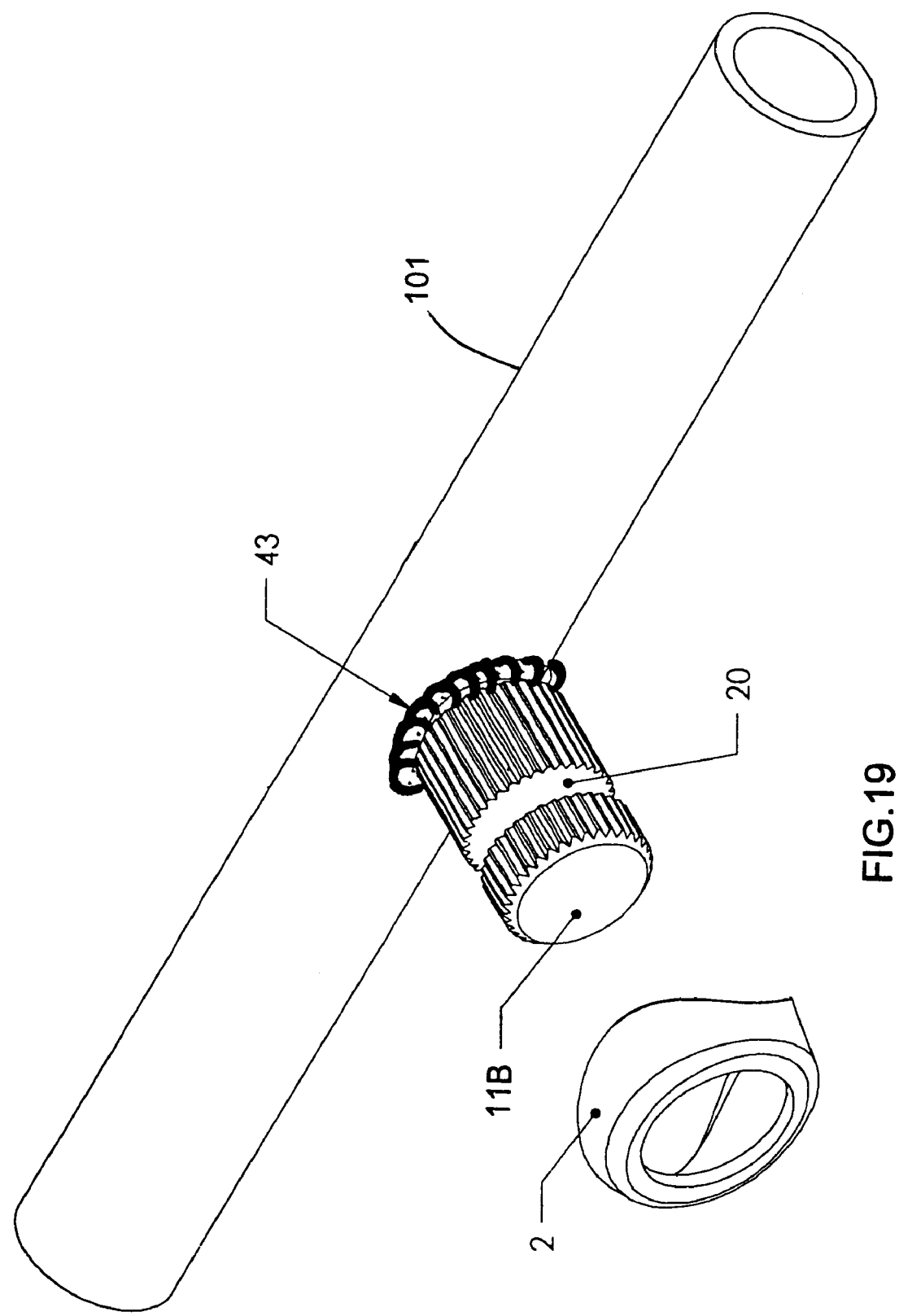
FIG. 19 is an exploded view of the accessory ready assembly according to the invention with a weld-on male spline configuration.

FIG. 19 shows the male spline fitting 11b as it is mounted on the tube 101 by a weld 43.

Figure 22:
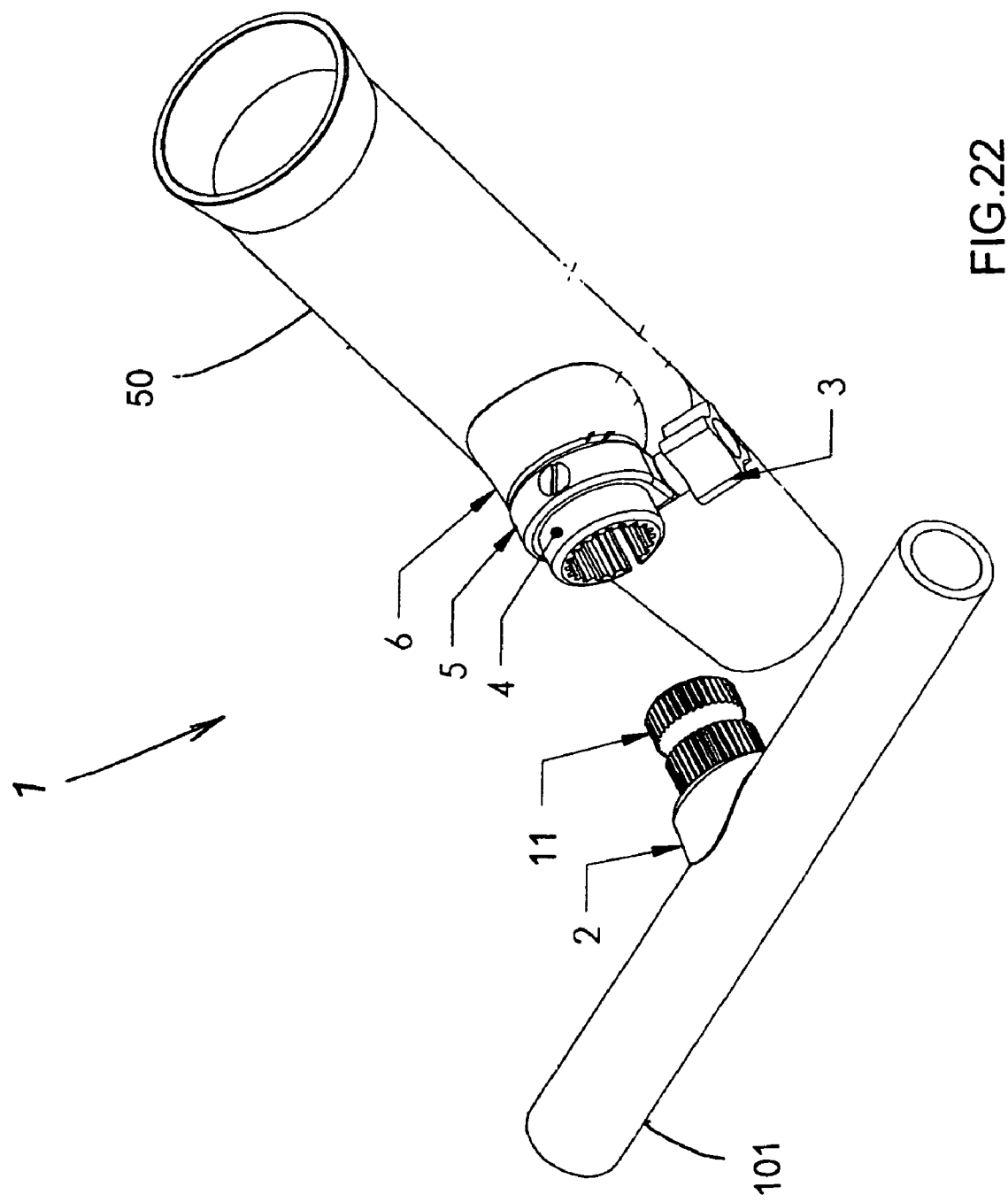
FIG. 22 is a perspective view of the accessory ready assembly according to the invention according to FIG. 19 with a rod holder tube.

FIG. 22 shows the female spline connector 4 with the clamp 5 ready to be mounted onto the male spline connector 11. As seen in the figure the rod holder 50 can be orientated at any desired position with respect to the tube 101.

Figure 23:
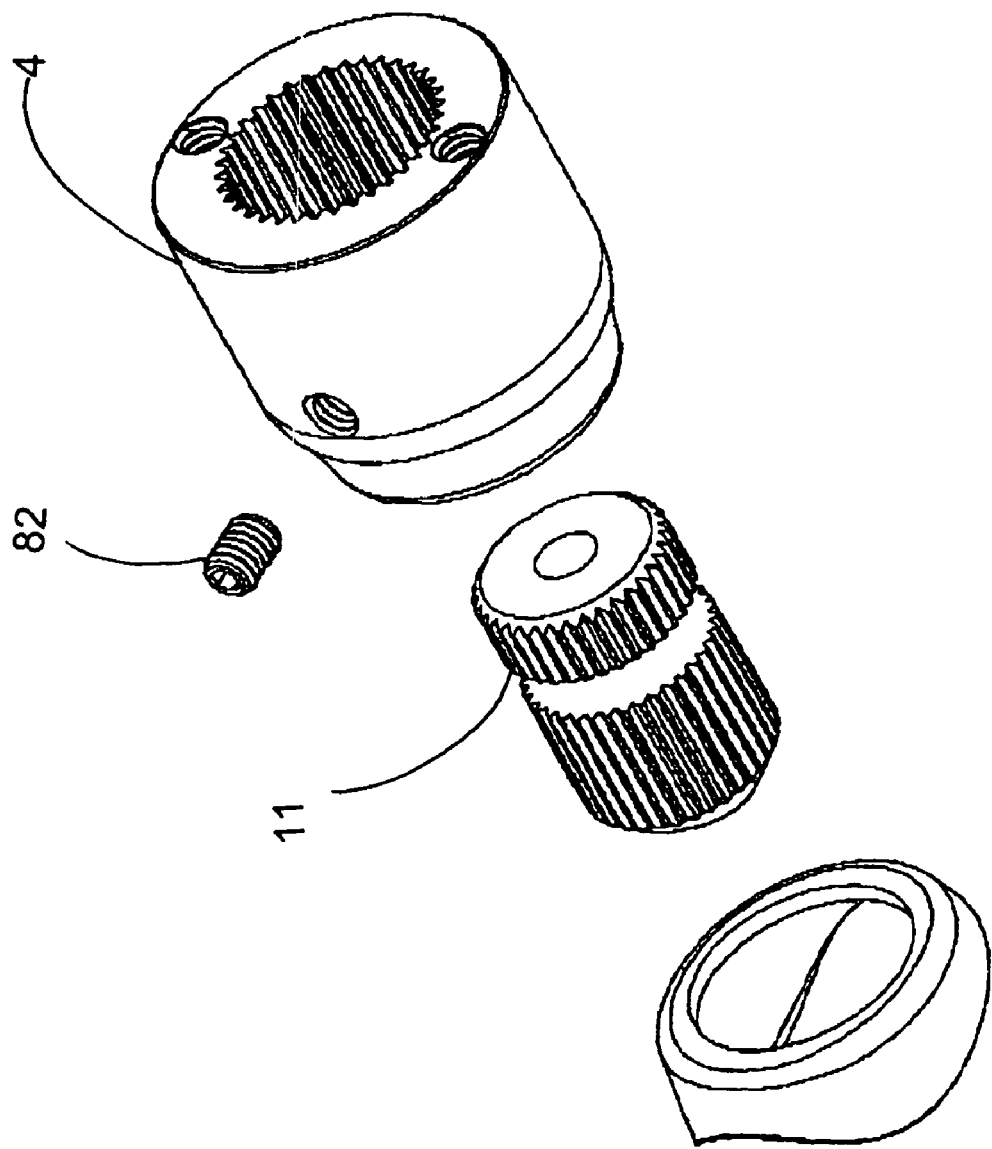
FIG. 23 is a perspective view of another embodiment of the accessory ready assembly according to the invention.

FIG. 23 shows another embodiment of the accessory ready assembly 1. In this embodiment the clamp 5 and the longitudinal slot 22 are eliminated and the female spline connector 4 is held in place on the male spline by a screw 82. While this embodiment does reduce the number of components required for the accessory ready assembly 1, it is not as easy to facilitate a change a position of the rod holder tube 50.

I claim:

1. An accessory ready assembly for mounting to a support structure on a marine vessel, the assembly comprising:
    a male spline fitting having an end face that is configured to mount onto the support structure;
    a female spline connector removably disposed on said male spline fitting, said female spline connector having a longitudinal slot and a cutout formed therein;
    an accessory disposed on an end of said female spline connector; and
    a clamp disposed on said female spline connector, said clamp securely fastening said female spline connector and said accessory to said male spline fitting, said clamp having a longitudinal gap formed therein defining two sides, each of said sides having a respective bore hole formed therein, said cutout and said bore holes receiving a fastener for fastening said female spline connector to said male spline fitting.

2. The assembly according to claim 1, wherein said clamp is affixed to said female spline connector by an additional fastener.

3. The assembly according to claim 2, wherein said fastener has a shaft, said male spline fitting has a radial groove having sidewalls, said shaft engages at least one of said sidewalls for securely fastening said female spline connector to said male spline fitting.

4. The assembly according to claim 1, wherein said fastener includes a nut and a knob for allowing a hand tightening of said fastener.

5. The assembly according to claim 1, wherein said male spline fitting has a longitudinal through hole formed therein for allowing electrical wires to pass through to said accessory.

6. The assembly according to claim 1, wherein said male spline fitting has a longitudinal threaded hole formed therein for fastening said male spline fitting to the support structure.

* * * * *